United States Patent

Matsui et al.

[11] Patent Number: 5,558,953
[45] Date of Patent: Sep. 24, 1996

[54] ELECTROCRYSTALLIZED LITHUIM METAL, METHOD FOR PRODUCING THE SAME, AND LITHIUM SECONDARY BATTERY

[75] Inventors: Tooru Matsui, Fujiidera; Kenichi Takeyama, Osaka, both of Japan

[73] Assignee: Matsushita Electric Industrial Co., LTD., Osaka-Fu, Japan

[21] Appl. No.: 319,761

[22] Filed: Oct. 7, 1994

[30] Foreign Application Priority Data

Oct. 21, 1993 [JP] Japan ................................. 5-263411

[51] Int. Cl.$^6$ .............................. H01M 6/14; H01M 4/58
[52] U.S. Cl. ........................ 429/194; 429/218; 205/50; 205/234; 205/560
[58] Field of Search ................................ 205/50, 234, 560; 429/194, 218; 204/105 R; H01M 6/14, 14/58

[56] References Cited

U.S. PATENT DOCUMENTS

| | | | |
|---|---|---|---|
| 3,580,828 | 5/1971 | Reddy | 205/234 |
| 3,953,302 | 4/1976 | Rao et al. | 205/234 |
| 4,652,506 | 3/1987 | Belanger et al. | 429/192 |
| 4,956,247 | 9/1990 | Miyazaki et al. | 429/194 |
| 5,154,784 | 10/1992 | Bennett | 156/62.2 |
| 5,294,502 | 3/1994 | Shackel et al. | 429/194 |

FOREIGN PATENT DOCUMENTS

| | | | |
|---|---|---|---|
| 0091565 | 5/1985 | Japan | 429/194 |
| 4104461 | 4/1992 | Japan . | |
| 4184864 | 7/1992 | Japan . | |
| 5101844 | 4/1993 | Japan . | |
| 5174818 | 7/1993 | Japan . | |
| 6-13070 | 1/1994 | Japan . | |

*Primary Examiner*—Kathryn Gorgos
*Attorney, Agent, or Firm*—Panitch Schwarze Jacobs & Nadel, P.C.

[57] ABSTRACT

A non-aqueous electrolyte secondary battery having a long cycle life and a high reliability with substantially no internal short-circuit is provided by incorporating crystalline metal lithium as its negative electrode. The crystalline metal lithium is electrochemically deposited on a metal substrate in an electrolyte including a tetrahydrofran derivative or a 1,3-dioxolan derivative as a solvent.

16 Claims, 4 Drawing Sheets

ELECTROCRYSTALLIZED LITHUIM METAL, METHOD FOR PRODUCING THE SAME, AND LITHIUM SECONDARY BATTERY

BACKGROUNDS OF THE INVENTION

1. Field of the Invention

The present invention relates to a non-aqueous electrolyte lithium secondary battery, and particularly to an improvement in the negative electrode lithium.

2. Description of the Prior Art

Non-aqueous electrolyte rechargeable batteries generally comprise a negative electrode having an alkali metal such as lithium as its active material and an electrolyte obtained by dissolving a solute such as $LiClO_4$, $LiBF_4$, $LiAsF_6$, $LiPF_6$ or $LiCF3SO_3$ in an organic solvent such as propylene carbonate, γ-butyrolactone, dimethoxyethane, tetrahydrofuran or dioxolan. Nowadays, since the non-aqueous electrolyte batteries have a high energy density, they are widely used as power sources in a variety of applications in small-sized electronic appliances such as electronic watches and clocks or cameras.

One of the problems encountered with the non-aqueous electrolyte batteries in enabling them to be rechargeable is that the alkali metal deposited on the surface of the negative electrode during the charging process is not flat but is in a state of tree-branch, needle and or fibril. In other words, a remarkable formation or growth of dendrite is observed with the deposited alkali metal. Once the dendrite in these states is formed, there will be produced not only a danger of an internal, short-circuit between the negative electrode and the positive electrode as a result of a growth of the dendrite but also a cuttings of the dendrite into pieces as a result of a local dissolution of the formed or grown dendrite, during the subsequent discharging process. Therefore, this produces a situation that all of the deposited alkali metal cannot be dissolved during the subsequent discharging process, thereby considerably deteriorating the charge/discharge efficiency of the battery.

In order to suppress the formation of the dendrite during the charging process, there has so far been proposed a method of charging the battery under such mild conditions as maintaining the negative electrode potential at −50 mV vs. $Li^+/Li$ or more noble, wherein the alkali metal (lithium) is deposited at a quantity of electricity density lower than 0.3 $mAh/cm^2$ (Progress in Batteries and Solar Cells, Vol. 2, pp. 54, 1979). Also, there has been proposed a method of improving the charge/discharge efficiency by combining a solvent having a high dielectric constant with another solvent having a low viscosity to be incorporated in the electrolyte (Electrochimica Acta, Vol. 30, pp. 1715, 1985).

In order to perform the charging process under the mild conditions as proposed in the above-mentioned publication, the area of the electrode plate must be expanded to 10 times or larger of that of the currently employed electrode, and thus, it is required to make the thickness of the electrode plate to be about 10 μm, in point of view of the charging period of the batteries to be accepted by the demand of the current market.

Incidentally, the thickness of metal lithium foil currently employed is generally about 80–100 μm, and the foil is prepared by means of extrusion molding through a die having a slit of the corresponding width by taking advantage of the softness of metal lithium. However, when it is intended to prepare the metal lithium foil having a thickness of about 10 μm by this extrusion molding process, the metal lithium will deform in a wave form at the outlet of the slit, and thus, the preparation of an electrode of the desired size has been remarkably difficult.

Further, the metal lithium foil obtained by the extrusion molding process contains a multiplicity of crystal grain boundaries and crystalline defects, and the sizes of the crystal grains are widely varied or scattered. The metal lithium foil thus prepared therefore has a disadvantage that it sometimes reacts with an organic solvent contained in the electrolyte at the crystal grain boundaries which are chemically active, and the surface of the metal lithium is unevenly covered by a film of passivated state, thereby to promote the development of the dendrite and to deteriorate the charge/discharge efficiency.

SUMMARY OF THE INVENTION

The present invention intends to obviate these disadvantages and deficiencies inherent to the prior art, and purposes to provide a crystalline metal lithium foil which is desirable as the electrode foil and has a uniform and smaller thickness than that of the prior art and provide a method for producing the same.

It is another object of the present invention to provide a non-aqueous electrolyte lithium secondary battery having a high degree of safety, a long charge/discharge cycle life and a high reliability with substantially no internal short-circuit, provided with a negative electrode composed of metal lithium having an excellent crystallinity, having a small dendrite formation and growth even with the repeated charge/discharge processes and a high charge/discharge efficiency.

The present invention provides a method for electrochemically depositing metal lithium having a high crystallinity on a cathode metal substrate, by electrolyzing in a lithium ion-conductive non-aqueous electrolyte.

In the present invention, the lithium ion-conductive non-aqueous electrolyte includes, as its solvent, at least one member selected from the group consisting of a tetrahydrofuran derivative represented by the formula:

(wherein, $R_1=C_mH_{2m+1}$, and $R_2=C_nH_{2n+1}$ and m and n do not represent 0 at the same time), and a 1,3-dioxolan derivative represented by the formula:

(wherein, $R_1=C_mH_{2m+1}$, and $R_2=C_nH_{2n+1}$ and m and n do not represent 0 at the same time).

Preferable lithium ion-conductive non-aqueous electrolyte comprises at least one member selected from the group consisting of the tetrahydrofuran derivative and the 1,3-dioxolan derivative as a sole solvent.

Further, another preferable lithium ion-conductive non-aqueous electrolyte comprises at least one member selected from the group consisting of the tetrahydrofuran derivative and the 1,3-dioxolan derivative, and at least one member selected from the group consisting of propylene carbonate, ethylene carbonate and diethyl carbonate, as a mixed solvent.

In the above-mentioned electrolysis, it is preferable to employ a material (an ion source) capable of electrochemically freeing lithium ions as a counter electrode. As the material capable of electrochemically freeing lithium ions, lithium alloys such as lithium-aluminum alloy, lithium-lead alloy and lithium-tin alloy, and any materials which are used as a positive electrode of a lithium secondary battery such as $LiMn_2O_4$ may be employed in addition to metal lithium.

Moreover, as the cathode metal substrate, a plate or foil of nickel and a stainless steel which optionally has a layer of lithium deposited on its surface, and a lithium foil may be employed. It is preferable for the cathode current density to be 20 $mA/cm^2$ or smaller, and more preferably 5 $mA/cm^2$ or smaller.

The crystalline metal lithium thus obtained in the electrochemical manner is characterized by a polygonal shape of its surface.

The non-aqueous lithium secondary battery in accordance with the present invention comprises a rechargeable positive electrode, a negative electrode composed of the crystalline metal lithium deposited on the above-mentioned metal substrate, and the above-mentioned lithium ion-conductive non-aqueous electrolyte. The above-mentioned metal substrate is utilized to function as a current collector for the negative electrode.

While novel features of the invention are set forth in the preceding, the invention, both as to organization and content, can be further understood and appreciated, along with other objects and features thereof, from the following detailed description and example when taken in conjunction with the attached drawings.

DESCRIPTION OF THE PREFERRED EMBODIMENTS

Based on a result of diversified investigation and scrutinization performed by the present inventors, it is found that lithium atoms(more strictly, adsorbed ions) deposited on the surface of the metal substrate will not be fixed at the deposit point in an electrolyte comprising a tetrahydrofuran derivatives and/or a 1,3-dioxolan derivative having a long alkyl group or groups as its side chain, but will be liable to be trapped at spots of a thermodynamically-stable crystal lattice, after they are allowed to diffuse on the surface.

When a crystal nucleus having many defects is formed immediately after initiation of the deposition, the deposited atoms therefore gather to the crystal nucleus, and enhance their crystallinity with the growth of the crystal nucleus. A sole solvent of these derivatives is preferable for constituting the electrolyte. However, if the alkyl group at the side chain becomes extremely long, the ion-conductivity of the resultant electrolyte will be lowered and surface charge density on the surface of the metal substrate during the deposition will increase, thereby making the diffusion of the deposited atoms on the surface difficult. In order to cope with this problem, propylene carbonate, ethylene carbonate or diethyl carbonate is mixed with the electrolyte as an ion-conductive auxiliary agent.

The group $R_1$ and/or $R_2$ in the formulae (1) and (2) are preferably alkyl groups each containing from 2 to 6 carbon atoms.

As the salt to be dissolved in the electrolyte, it is desirable to employ a lithium salt selected from the group consisting of $LiClO_4$, $LiCF3SO_3$, $LiPF_6$ and $LiBF_4$. In particular, it is preferable to employ $LiClO_4$ or $LiCF3SO_3$. The reason for this is that they do not decompose the tetrahydrofuran derivative or the 1,3-dioxolan derivative since these salts liberate only extremely small amount of free acid. Further, the cathode current density in depositing lithium on the metal substrate is desirably 20 $mA/cm^2$ or smaller. If the current density exceeds 20 $mA/cm^2$, the lithium deposited on the metal substrate becomes dendrite even when the above-mentioned electrolyte is used and becomes unavailable as a negative electrode of a non-aqueous electrolyte secondary battery.

When the metal lithium having a high crystallinity in accordance with the present invention is used in a negative electrode of a non-aqueous electrolyte secondary battery as its active material, its dissolution is uniform by virtue of its dense crystal structure, and the electrode surface will not be roughened during the dissolution process in discharging. Therefore, the surface diffusion of the deposited atoms is maintained to proceed preferably even if lithium is deposited during the subsequent charging process, and the dendrite formation or growth is suppressed to its minimum. In addition, the charge/discharge efficiency is improved at the same time.

As a rechargeable positive electrode of the lithium secondary battery in accordance with the present invention, it is preferable to use an active material such as $LiMn_2O_4$ or $MnO_2$, capable of imparting a discharge voltage of 3V level, by combining it with a lithium negative electrode. If such a positive electrode active material as $LiCoO_2$, which imparts a discharge voltage of 4V level in a combination of the lithium negative electrode, is employed, there will be a danger of decomposing the above-mentioned tetrahydrofuran derivative represented by the formula (1) and the 1,3-dioxolan derivative represented by the formula (2).

In an embodiment of the present invention, the negative electrode may be configured with a current collector in a discharged state of the battery, for instance, a plate or foil made of nickel or stainless steel, and then lithium may be caused to deposit on the current collector as a result of charging. In that case, the negative electrode is combined with a positive electrode made of such a material as $L_iMn_2O_4$ which is capable of freeing lithium ions during the charging process. Further, a material such as $MnO_2$ which cannot free lithium ions may also be used as the positive electrode and incorporated in the battery, if metal lithium is adhered to the surface of the material. In that case, in the presence of the electrolyte, the lithium having adhered to the positive electrode is absorbed by the positive electrode active material, $MnO_2$. And then, the positive electrode active material having absorbed the lithium is converted into $LiMnO_2$. In this manner, the positive electrode becomes capable of freeing lithium ions by charging.

As a method of mass-producing the negative electrode which is an assembly of the current collector (metal substrate) with lithium deposited thereon, there is such an embodiment process of (i) drawing out the current collector in a long belt state from its coil by unwinding the coil, (ii) electrolytically depositing lithium on the current collector during its travel through an electrolyte bath filled with the above-mentioned electrolyte, and (iii) cutting the assembly of the current collector with the deposited lithium to an electrode in a predetermined size.

As discussed in the above, in accordance with the present invention, it is possible to obtain a crystalline metal lithium foil which has a smaller and uniform thickness than those of the prior art, and is available as the electrode foil. Further, by utilizing the crystalline metal lithium, a provision of a non-aqueous electrolyte secondary battery having a high degree of safety, a long charge/discharge cycle life and a high reliability is obtainable, by configuring a negative electrode which has a small dendrite formation or growth during the repetition of charging and discharging and a high charge/discharge efficiency.

Application of the crystalline metal lithium obtained by the method of the present invention is not limited to an electrode of a battery.

In the following paragraphs, concrete examples of the present invention together with comparative examples will be described with reference to the attached drawings.

EXAMPLE 1

An electrolyte was prepared by dissolving 1 mole lithium perchlorate ($LiClO_4$) in one liter of 4-ethyl-1,3-dioxolan. A lithium foil was used as a metal substrate cathode and another lithium foil was used as an anode. The cathode and anode were placed in the electrolyte in a manner that both are opposing each other, and a cathode current of 5 mA/$cm^2$ was passed through the metal substrate for one hour to deposit lithium on the metal substrate. The metal lithium electrochemically deposited in this manner was regarded as one working example of the present invention. As a comparative example, another electrolyte was prepared by dissolving 1 mole $LiClO_4$ in one liter of a mixed solvent of propylene carbonate and dimethoxyethane (1:1 by volume) and used in depositing lithium on another metal substrate under the same conditions as the working example.

Figure 1A:
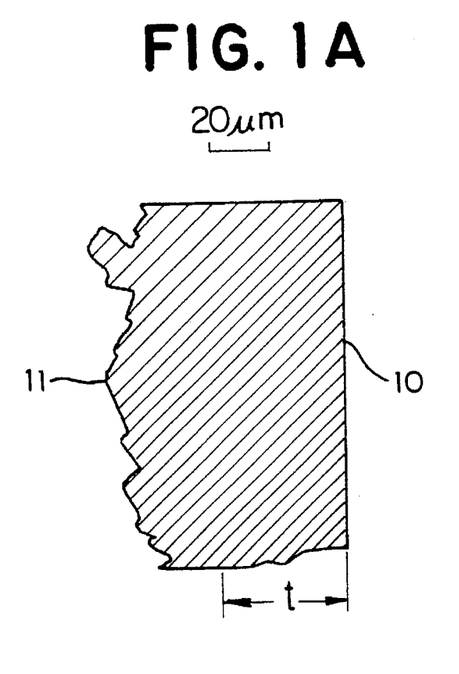
FIG. 1A and FIG. 1B are, respectively, cross-sectional views of the crystalline metal lithium deposited on the metal substrate in accordance with an embodiment of the present invention.
Figure 1B:
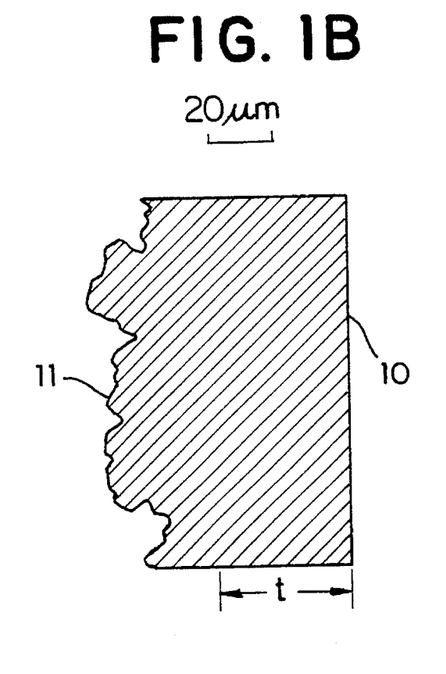
Figure 2:
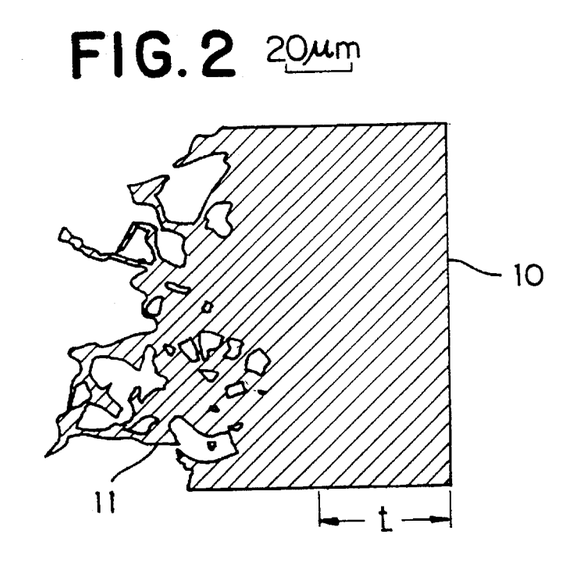
FIG. 2 is a cross-sectional view of metal lithium of low crystallinity deposited on the metal substrate in accordance with a comparative example.

FIG. 1A and FIG. 1B show cross-sections of the deposited metal lithium having a high degree of crystallinity of the present invention, and FIG. 2 shows a cross-section of the metal lithium deposited in a fibril or needle state of low crystallinity of the comparative example. Both of the figures are optical microscopic photograms with an enlargement ratio of about 400. In these figures, a reference numeral 10 designates a metal substrate having a thickness (t) of about 50 µm, and a reference numeral 11 designates the metal lithium deposited on the metal substrate 10. As clearly shown in FIG. 1A and FIG. 1B, it is appreciated that the metal lithium electrochemically deposited in accordance with the working example of the present invention has a surface of a square or polygonal shape with no gaps or crevices, which reflects a body-centered lattice of lithium. It is also appreciated that the thickness of the deposited lithium of this example is 30 µm or smaller, and a production of a very thin lithium foil which has been difficult to produce by the extrusion molding process is now made possible. In contrast to this, in a mode of deposition of the comparative example, the deposited lithium is grown largely towards the electrolyte. Such mode of deposition is very dangerous because the grown dendrite will cause an internal short-circuit between the negative electrode and the positive electrode in the cell.

EXAMPLE 1

In this example, as a means for conveniently measuring the high crystallinity of the metal lithium deposited in accordance with the present invention, a degree of electrochemical dissolution of the metal lithium is utilized. The higher the crystallinity is, the smaller the number of the lattice defect is; and the progress of uneven dissolution is hindered and a substantially complete dissolution can be reached.

In a manner similar to that in Example 1, an electrolyte was prepared by dissolving 1 mole $LiClO_4$ in one liter of 4-ethyl-1,3-dioxolan. As the metal substrate on which lithium is to be deposited, a nickel foil was used. The nickel foil cathode and a lithium foil anode were placed in the electrolyte in a manner that both are opposing each other, and a cathode current of 5 mAh/$cm^2$ was passed through the nickel foil for 3.3 hours to deposit lithium on the nickel foil (Total quantity of the passed electricity: 16.5 mAh/$cm^2$). The lithium-nickel foil assembly produced in this manner was regarded as Electrode "a" of the present invention.

As Electrode "b" of a comparative example, an electrode was prepared by adhering a lithium foil having a thickness of 80 µm molded by means of extrusion process (equivalent to quantity of electricity: 16.5 mAh/$cm^2$) onto a nickel foil with an application of pressure.

An anode current of 5 mA/$cm^2$ was passed through each of the electrodes produced in the above-mentioned manner in the above-mentioned electrolyte, to dissolve the lithium on the nickel foils for observing changes in electrode potential. In this observation, an electrode potential equal to 1 V vs. Li/$Li^+$ was regarded as an end point of the dissolution of the lithium on the nickel foil.

Figure 3:
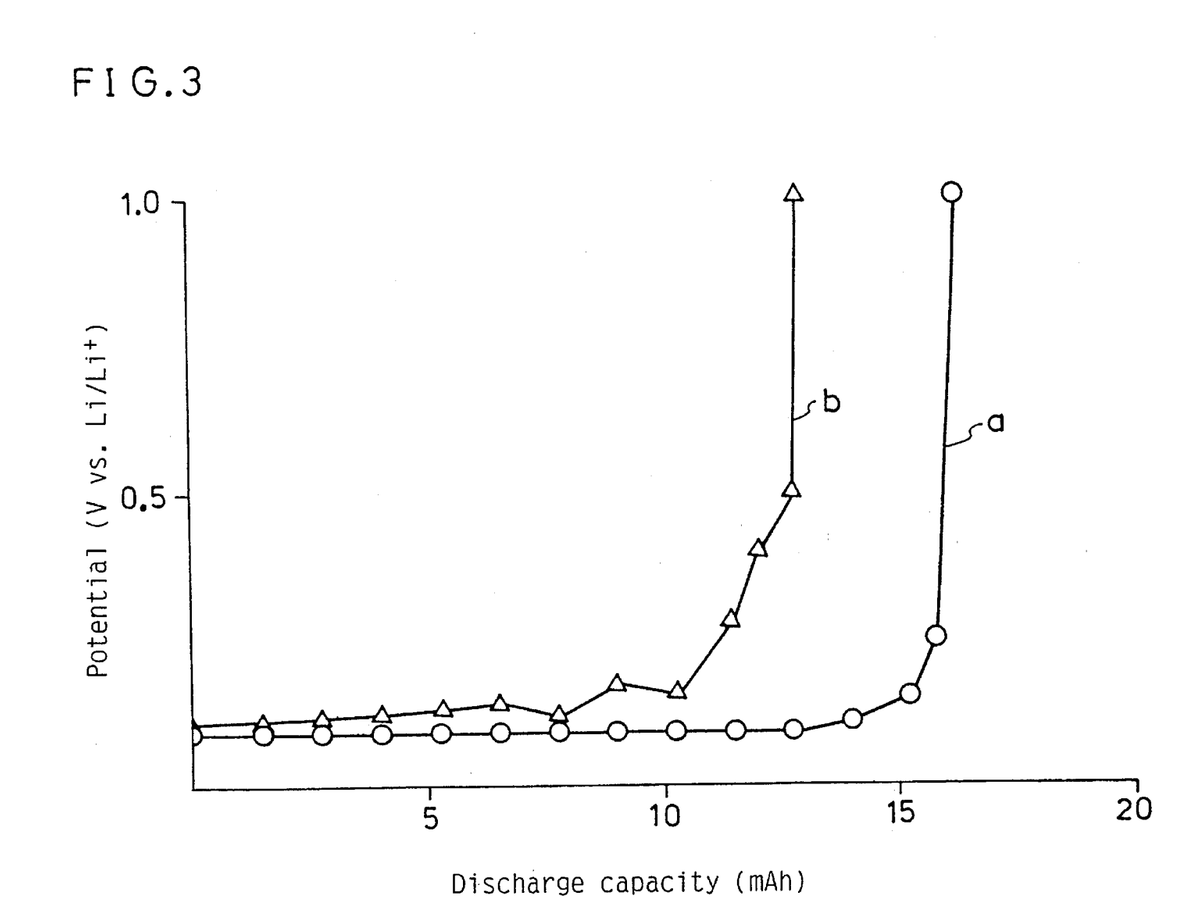
FIG. 3 is a diagram representing changes in potential during the dissolution process plotted against the discharge capacity, of an electrode comprising the crystalline metal lithium deposited in accordance with the embodiment of the present invention, and of another electrode comprising a metal lithium obtained by a extrusion molding process of the comparative example.

FIG. 3 is a diagram representing changes in both the electrode potentials plotted against the discharge capacity. As clearly seen from this diagram, it is appreciated that Electrode "a" of the present invention demonstrates a small and stable dissolution potential, that the quantity of the electricity for the total anode current passed until the end of the dissolution is about 16.5 mAh/$cm^2$ and that the deposited lithium is dissolved at about 100%. It is believed that since the metal lithium of the present invention has a high degree of crystallinity and is closely adhered to the nickel foil, it is uniformly dissolved from the surface of the electrode.

In contrast to this, it is appreciated that Electrode "b" of the comparative example demonstrates a high and unstable electrode potential at the end point of the dissolution, that the quantity of the electricity for the anode current passed until the end of the dissolution is about 13.0 mAh/$cm^2$, and that the adhered lithium still remains on the nickel foil at about 21%. It is believed that since the crystallinity of the molded metal lithium is low, it is unevenly dissolved from the nickel foil and remains as spots of all island shape which are not electrically conductive to the nickel foil.

EXAMPLE 3

An electrolyte was prepared by mixing one of tetrahydrofuran derivatives having an alkyl group on its 2-position with propylene carbonate (PC) and/or ethylene carbonate (EC), and by dissolving 1 mole $LiClO_4$ in one liter of one of the mixed solvents as listed with their mixing ratios in Table 1 below. In the electrolyte thus prepared, lithium was deposited on a nickel foil at a cathode current density of 5 $mA/cm^2$, and then an anode current is passed through the nickel foil to dissolve the deposited lithium in a manner similar to that in Example 2, whereby charge/discharge efficiency was calculated based on the end point of the dissolution, in accordance with the following formula:

Charge/discharge efficiency=100×(quantity of dissolved lithium)/(quantity of the deposited lithium)

Table 1 below summarizes the charge/discharge efficiencies obtained by using mixed solvents of various tetrahydrofuran derivatives and propylene carbonate (PC) as well as ethylene carbonate (EC). In Table 1, there is also shown the charge/discharge efficiency obtained with a comparative example performed by using an electrolyte, which dissolved $LiClO_4$ a mixed solvent of propylene carbonate (PC) and dimethoxyethane (DME) of 1:1 by volume in 1 mol/L.

TABLE 1

| Alkyl group | Mixing ratio by volume Derivative:PC:EC | Charge/discharge efficiency (%) |
| --- | --- | --- |
| Methyl | 1:1:1 | 75.9 |
| Ethyl | 1:1:0.5 | 86.6 |
| Propyl | 1:1.5:0.5 | 91.5 |
| Butyl | 1:2:0.5 | 89.0 |
| Pentyl | 1:4:0 | 83.3 |
| Hexyl | 1:9:0 | 75.7 |
| Comparative example | DME:PC = 1:1 | 68.4 |

As clearly shown by Table 1, it is appreciated that metal lithium having a high charge/discharge efficiency can be obtained by embodying the production method of the present invention. The 2-methyltetrahydrofuran was, however, highly volatile, and thus, maintenance of the composition of the electrolyte including the tetrahydrofuran derivative to be constant is substantially difficult, and the obtained charge/discharge efficiency is only slightly higher than that of the comparative example. Further, since the derivatives having a substituent group with 7 or more carbon atoms, such as heptyl group are miscible with propylene carbonate (PC) or ethylene carbonate (EC) in only a small proportion, they do not contribute to a remarkable improvement in the charge/discharge efficiency. Therefore, it is concluded that, in the case of a tetrahydrofuran derivative having an alkyl group at its 2-position, the number of the carbon atoms in the alkyl group is desirably from 2 to 6.

EXAMPLE 4

An electrolyte was prepared by mixing one of tetrahydrofuran derivatives having an alkyl group on its 3-position with propylene carbonate (PC) and/or ethylene carbonate (EC), and by dissolving 1 mole $LiClO_4$ in one liter of one of the mixed solvents as listed with their mixing ratios in Table 2 below. Each of the electrolytes was used in a process of depositing lithium on a nickel foil and dissolving the deposited lithium in a manner similar to that in Example 3.

Each of the charge/discharge efficiencies of the deposited lithium was calculated in a manner similar to that in Example 3. Table 2 below summarizes the charge/discharge efficiencies obtained by using mixed solvents of various tetrahydrofuran derivatives and propylene carbonate (PC) as well as ethylene carbonate (EC). The charge/discharge efficiency obtained with a comparative example performed as described in Example 3 is also shown in Table 2.

TABLE 2

| Alkyl group | Mixing ratio by volume Derivative:PC:EC | Charge/discharge efficiency (%) |
| --- | --- | --- |
| Methyl | 1:1:1.5 | 87.1 |
| Ethyl | 1:1:1 | 93.2 |
| Propyl | 1:1.5:1 | 94.7 |
| Butyl | 1:2:1 | 91.3 |
| Pentyl | 1:3:1 | 86.4 |
| Hexyl | 1:5:0.5 | 74.5 |
| Comparative example | DME:PC:1:1 | 68.4 |

AS clearly shown by Table 2, it is appreciated that metal lithium having a high charge/discharge efficiency can be obtained by embodying the production method of the present invention. Further, since the tetrahydrofuran derivative having a heptyl group at its 3-position is miscible wish propylene carbonate (PC) or ethylene carbonate (EC) in only a small proportion, similarly to the tetrahydrofuran derivative having a heptyl group at its 2-position of Example 3, it does not contribute to a remarkable improvement in the charge/discharge efficiency. Therefore, it is concluded that, in the case of a tetrahydrofuran derivative having an alkyl group at its 3-position, the number of the carbon atoms in the alkyl group is also desirably from 2 to 6.

EXAMPLE 5

An electrolyte was prepared by mixing one of 1,3-dioxolan derivatives having an alkyl group on its 2-position with propylene carbonate (PC) and/or ethylene carbonate (EC), and by dissolving $LiClO_4$ (1 mole/liter) in one of the mixed solvents as listed with their mixing ratios in Table 3 below. The obtained electrolyte was used in a process of depositing lithium on a nickel foil and dissolving the deposited lithium in a manner similar to that in Example 3. Each of the charge/discharge efficiencies was calculated in a manner similar to that in Example 3. Table 3 below summarizes the charge/discharge efficiencies obtained by using mixed solvents of various 1,3-dioxolan derivatives and propylene carbonate (PC) as well as ethylene carbonate (EC). The charge/discharge efficiency obtained with a comparative example performed as described in Example 3 is also shown in Table 3.

TABLE 3

| Alkyl group | Mixing ratio by volume Derivative:PC:EC | Charge/discharge efficiency (%) |
| --- | --- | --- |
| Methyl | 1:1:1.5 | 69.3 |
| Ethyl | 1:1:1 | 83.7 |
| Propyl | 1:1.5:1 | 91.2 |
| Butyl | 1:2:1 | 88.5 |
| Pentyl | 1:3:1 | 82.5 |
| Hexyl | 1:5:0.5 | 74.1 |
| Comparative example | DME:PC = 1:1 | 68.4 |

As clearly shown by Table 3, it is appreciated that metal lithium having a high charge/discharge efficiency can be obtained by embodying the production method of the present invention. Further, since the 2-methyl-1,3-dioxolan is highly volatile similarly to the results obtained in Example 3, the obtained charge/discharge efficiency is hardly higher than that of the comparative example. Further, since the 1,3-dioxolan derivatives having a heptyl group at its 2-position are miscible with propylene carbonate (PC) or ethylene carbonate (EC) in only a small proportion, they do not contribute to a remarkable improvement in the charge/discharge efficiency. By considering these fact, it is concluded that in the case of a 1,3-dioxolan derivative having an alkyl group at its 2-position, the number of the carbon atoms in the alkyl group is desirably from 2 to 6.

EXAMPLE 6

An electrolyte was prepared by mixing one of 1,3-dioxolan derivatives having an alkyl group on its 4-position with propylene carbonate (PC) and/or ethylene carbonate (EC), and by dissolving $LiClO_4$ (1 mole/liter) in one of the mixed solvents as listed with their mixing ratios in Table 4 below. The prepared electrolyte was used in a process of depositing lithium on a nickel foil followed by dissolving the deposited lithium in a manner similar to that in Example 5. Each of the charge/discharge efficiencies was calculated in a manner similar to that in Example 5. Table 4 below summarizes the charge/discharge efficiencies obtained by using mixed solvents of various 1,3-dioxolan derivatives and propylene carbonate (PC) as well as ethylene carbonate (EC). The charge/discharge efficiency obtained with a comparative example performed as described in Example 3 is also shown in Table 4.

TABLE 4

| Alkyl group | Mixing ratio by volume Derivative:PC:EC | Charge/discharge efficiency (%) |
| --- | --- | --- |
| Methyl | 1:1:1.5 | 81.6 |
| Ethyl | 1:1:1 | 88.4 |
| Propyl | 1:1.5:1 | 93.7 |
| Butyl | 1:2:1 | 92.3 |
| Pentyl | 1:3:1 | 87.7 |
| Hexyl | 1:5:0.5 | 75.2 |
| Comparative example | DME:PC = 1:1 | 68.4 |

As clearly shown by Table 4, it is appreciated that metal lithium having a high charge/discharge efficiency can be obtained by embodying the production method of the present invention. Further, similarly to the results obtained in Example 5, since the 1,3-dioxolan derivatives having a heptyl group at their 4-position are miscible with propylene carbonate (PC) or ethylene carbonate (EC) in only a small proportion, they do not contribute to a remarkable improvement in the charge/discharge efficiency. It is, therefore, concluded that, in the case of a 1,3-dioxolan derivative having an alkyl group at its 4-position, the number of the carbon atoms in the alkyl group is also desirably from 2 to 6.

Although monoalkyl-substituted derivatives were used in Examples 3–6, similar advantages will be obtained by using a dialkyl-substituted derivative, and an improvement in the charge/discharge efficiency is observed with the tetrahydrofuran derivative and 1,3-dioxolan derivative having an alkyl group or groups with carbon atoms from 2 to 6.

EXAMPLE 7

An electrolyte was prepared by dissolving $LiCF_3SO_3$ (1 mole/liter) in a mixed solution of 2-methyl-4-ethyl-1,3-dioxolan, propylene carbonate (PC) and ethylene carbonate (EC) (1: 1.5.: 0.5 by volume). In this electrolyte, lithium was deposited on a nickel foil by passing a cathode current of 10 $mA/cm^2$ for 2 hours through the nickel foil to give a lithium-nickel foil assembly.

Figure 4:
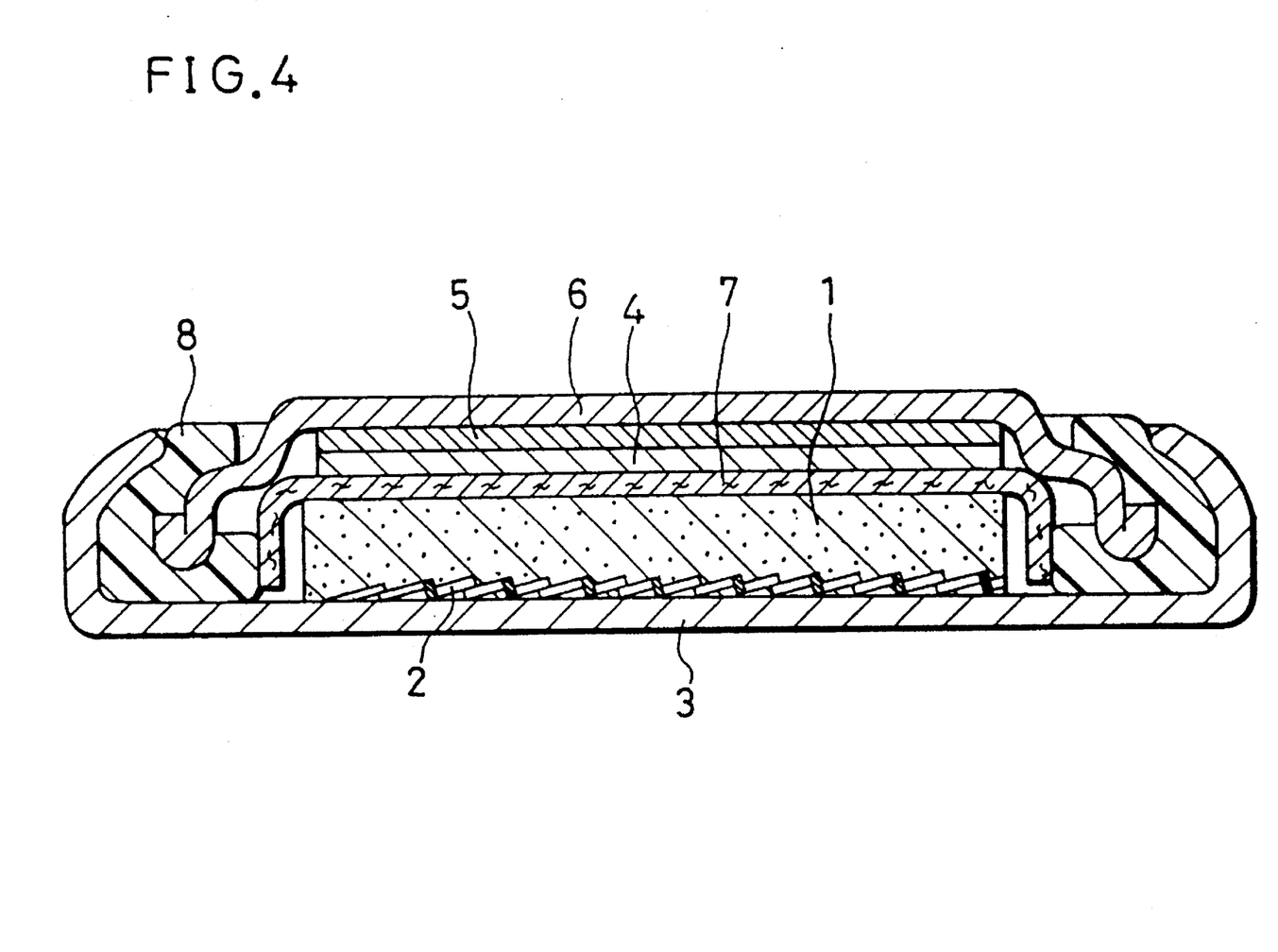
FIG. 4 is a cross-sectional view of a flat-type battery built in accordance with an embodiment of the present invention.

Next, a battery of flat-type as shown by FIG. 4 was produced by using the above-mentioned electrolyte and the lithium-nickel foil assembly. Hereinafter, a description will be made by referring to FIG. 4.

As shown by FIG. 4, a positive electrode 1 is configured by press-molding a mixture composed of $LiMn_2O_4$ powder, carbon black and tetrafluoroethylene resin powder onto an expanded metal current collector 2 made of titanium which has previously been spot-welded to a bottom of a positive electrode-enclosure 3. A negative electrode is configured first by partly ripping off the lithium 4 from the above-mentioned assembly lithium-nickel foil 5 comprising a disk which has previously punched into a disk shape and then spot-welded of its exposed nickel part to a sealing disk 6. As a separator 7, a porous film made of polypropylene is used. After injecting the abovementioned electrolyte into the enclosure, a battery is configured by combining the positive electrode-enclosure 3 with the sealing disk 6, interlaying a gasket 8, and crimping the open end of the enclosure 3 to seal. The battery thus obtained is a battery of the working example.

Separately from this, a battery of the comparative example was configured in a manner similar to that of the working example, except for the use of another lithium-nickel foil assembly prepared by adhering a lithium foil, which is an extrusion molding product and has a thickness of 100 μm, to a nickel foil with an application of pressure.

Both multiplicity of the batteries of the working example and the comparative example thus configured were subjected to a charge/discharge cycle test under conditions of a current density: 3 $mA/cm^2$, a lower limit discharge voltage: 2.5V and an upper limit charge voltage: 3.5V. The cycle life in the charge/discharge cycle test was regarded to end when the discharge capacity of each of the battery became 1/10 of the initial value.

Table 5 summarizes average values of the cycle lives of the batteries of the working example and the comparative example. Percentages of the batteries which suffer an internal short-circuit in the battery and develop a fire, before reaching the end of cycle life are also shown in Table 5.

TABLE 5

| | Charge/discharge cycle life | Number of fired batteries (%) |
| --- | --- | --- |
| Batteries of the working example | 289 ± 32 | 0 |
| Batteries of the comparative example | 173 ± 55 | 8 |

As clearly seen from Table 5, it is appreciated that a remarkable improvement in the average charge/discharge cycle life (1.7 times) is realized by using the metal lithium having a high degree of crystallinity of the present invention in its negative electrode, and that the fire developed in the battery due to internal short-circuit is also obviated.

EXAMPLE 8

In a manner similar to that in Example 7, a lithium-nickel foil assembly was produced in an electrolyte prepared by dissolving $LiCF_3SO_3$ (1 mole/liter) in a mixed solution of 2-methyl-4-ethyl-1,3-dioxolan, propylene carbonate and ethylene carbonate (1:1.5:0.5 by volume). Next, by using this lithium-nickel foil assembly as its negative electrode, another flat-type battery similar to that of Example 7 was configured. In this example, however, as the electrolyte to be injected to the flat-type battery enclosure, an electrolyte prepared by dissolving LiClO$_4$ (1 mole/liter) in a mixed solution of propylene carbonate and dimethoxyethane (1:1 by volume) was used. The battery thus obtained is indicated as a battery of the working example.

Separately from this, a battery of the comparative example was configured in a manner similar to the working example, except for the use of a lithium-nickel foil assembly prepared by adhering a lithium foil, which is an extrusion molding product, to a nickel foil with an application of pressure.

A multiplicity of both batteries of the working example and the comparative example thus configured were subjected to a charge/discharge test under conditions of a current density: 1 mA/cm$^2$, a lower limit discharge voltage: 2.5V and an upper limit charge voltage: 3.5V. The cycle life in the charge/discharge cycle test was regarded to end when the discharge capacity became $\frac{1}{10}$ of the initial value.

Table 6 summarizes average values of the cycle lives of the batteries of the working example and the comparative example. Percentages of the batteries which suffer an internal short-circuit in the battery to develop a fire before reaching the end of cycle life are also shown in Table 6.

TABLE 6

|  | Charge/discharge cycle life | Number of fired batteries (%) |
| --- | --- | --- |
| Batteries of the working example | 217 ± 24 | 0 |
| Batteries of the comparative example | 123 ± 39 | 17 |

As clearly seen from Table 6, it is appreciated that a remarkable improvement in the average charge/discharge cycle life (1.8 times) is realized by using the metal lithium having a high degree of crystallinity of the present invention in its negative electrode, and that the fire developed in the battery due to internal short-circuit is also obviated.

Further, based on a comparison of the result shown in Table 5 of Example 7 with that shown in Table 6 of this example, it is concluded that a non-aqueous electrolyte secondary battery having a long charge/discharge cycle life and a high degree of safety can be realized as a result of employing an electrolyte used in producing metal lithium of high crystallinity also as a driving electrolyte.

EXAMPLE 9

Figure 5:
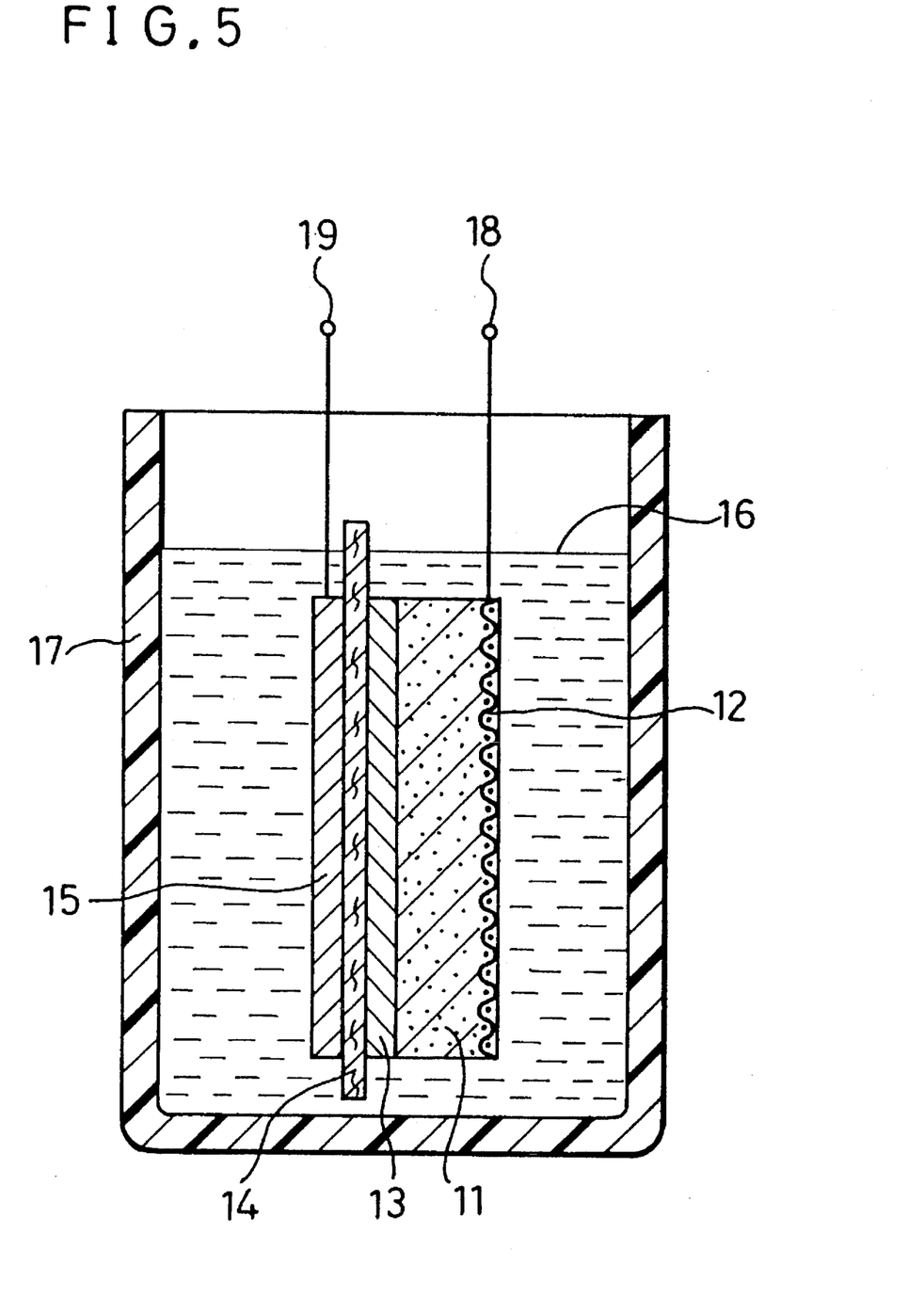
FIG. 5 is a cross-sectional view of a test cell used in another embodiment of the present invention.

FIG. 5 shows a test cell of this example. In FIG. 5, a positive electrode 11 is configured by molding a mixture composed of MnO$_2$ powder, carbon black as a conductive agent and tetrafluoroethylene resin powder onto a net-type current collector 2 made of titanium into an assembly with an application of pressure. On the surface of this positive electrode 11, a metal lithium foil 13 having a thickness of about 80 μm is adhered, and is combined with a nickel foil 15 serving as the negative electrode-current collector and a separator 14 made of a porous polypropylene film; and thereafter, the combined body is inserted into a cell container 17. Next, an electrolyte 16 prepared by dissolving LiCF$_3$SO$_3$ (1 mole/liter) in a mixed solution of 2-methyl-4-ethyl-1,3-dioxolan, propylene carbonate and ethylene carbonate (1:1.5: 0.5 by volume), is injected into the container 17. After standing the combined body in this state for about a whole day, the lithium 13 is completely absorbed in the positive electrode 11. The amount of the lithium 13 used in this example is equivalent to $\frac{8}{90}$ of the MnO$_2$ in the positive electrode. In FIG. 5, reference numerals 18 and 19 designate lead terminals for the positive electrode 11 and the negative electrode 15, respectively.

When the test cell thus configured was charged with a current density of 3 mA/cm$^2$ up to a terminal voltage of 3.7V, lithium was deposited on the nickel foil of the negative electrode current collector 15. Next, charge/discharge cycles were performed under conditions of a lower limit discharge voltage of 2.5V and an upper limit charge voltage of 3.7V. After 170 cycles, the discharge capacity of this test cell became $\frac{1}{10}$ of its initial value.

It is understood that various other modifications will be apparent to and can be readily be made by those skilled in the art to which this invention pertains without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof, by those skilled in the art to which this invention pertains.

What is claimed is:

1. Crystalline metal lithium having a polygonal surface shape deposited on a cathode metal substrate by electrolysis of a lithium ion-conductive non-aqueous liquid electrolyte.

2. A method for producing crystalline metal lithium with a polygonal surface shape consisting of the steps of:

disposing in opposition to each other a metal substrate as a cathode and an ion source as an anode that electrochemically frees lithium ions, in a lithium ion-conductive non-aqueous liquid electrolyte including, as its solvent, at least one member selected from the group consisting of tetrahydrofuran derivatives represented by the formula:

(1)

wherein $R_1=C_mH_{2m+1}$, and $R_2=C_nH_{2n+1}$, and m and n do not represent 0 at the same time and 1,3-dioxolan derivatives represented by the formula:.

(2)

wherein $R_1=C_mH_{2m+m}$, and $R_2=C_nH_{2n+1}$, and m and n do not represent 0 at the same time, and passing a cathode current through said metal substrate to deposit lithium with a polygonal surface shape on said metal substrate.

3. The method for producing crystalline metal lithium in accordance with claim 2, wherein the solvent in said electrolyte is a sole solvent of at least one member selected from the group consisting of said tetrahydrofuran derivatives and said 1,3-dioxolan derivatives.

4. The method for producing crystalline metal lithium in accordance with claim 3, wherein at least one of $R_1$ and $R_2$ in said formulae (1) and (2) is an alkyl group containing from 2 to 6 carbon atoms.

5. The method for producing crystalline metal lithium in accordance with claim 3 wherein said metal substrate is made of nickel, stainless steel or lithium.

6. The method for producing crystalline metal lithium in accordance with claim 3, wherein said ion source is lithium, an alloy containing lithium, $LiMnO_2$ or $LiMn_2O_4$.

7. The method for producing crystalline metal lithium in accordance with claim 3 wherein said cathode current has a current density of 20 mA/cm$^2$ or smaller.

8. The method for producing crystalline metal lithium in accordance with claim 2, wherein the solvent in said electrolyte is a mixed solvent of at least one member selected from the group consisting of said tetrahydrofuran derivatives and said 1,3-dioxolan derivatives, with at least one member selected from the group consisting of propylene carbonate, ethylene carbonate and diethyl carbonate.

9. A non-aqueous liquid electrolyte lithium secondary battery comprising:

a rechargeable positive electrode, a negative electrode composed of a metal substrate having a deposited metal lithium obtained by a method in accordance with claim 2 and said lithium ion-conductive non-aqueous liquid electrolyte including, as its solvent, at least one member selected from the group consisting of tetrahydrofuran derivatives represented by the formula:

(1)

wherein, $R_1=C_mH_{2m+1}$, and $R_2=C_nH_{2n+1}$, and m and n do not indicate 0 at the same time and 1,3-dioxolan derivatives represented by the formula:

(2)

wherein, $R_1=C_mH_{2m+1}$, and $R_2=C_nH_{2n+1}$, and m and n do not represent 0 at the same time).

10. A non-aqueous liquid electrolyte lithium secondary battery comprising:

a rechargeable positive electrode, a negative electrode consisting of metal lithium with a polygonal surface shape deposited on a metal substrate by electrolysis of a lithium ion-conductive non-aqueous liquid electrolyte, and a lithium ion-conductive non-aqueous liquid electrolyte.

11. The non-aqueous liquid electrolyte lithium secondary battery in accordance with claim 10, wherein said metal substrate is made of nickel, a stainless steel or lithium.

12. The non-aqueous liquid electrolyte lithium secondary battery in accordance with claim 10, wherein said positive electrode comprises $LiMn_2O_4$ or $MnO_2$ as its active material.

13. The non-aqueous liquid electrolyte lithium secondary battery in accordance with claim 10, wherein said lithium ion-conductive non-aqueous liquid electrolyte includes, as its solvent, at least one member selected from the group consisting of tetrahydrofuran derivatives represented by the formula:

wherein $R_1=C_mH_{2m+1}$, and $R_2=C_nH_{2n+1}$, and m and n do not represent 0 at the same time, and 1,3-dioxolan derivatives represented by the formula:

wherein $R_1=C_mH_{2m+1}$, and $R_2=C_nH_{2n+1}$, and m and n do not represent 0 at the same time.

14. The non-aqueous liquid electrolyte lithium secondary battery in accordance with claim 13, wherein the solvent in said electrolyte is a sole solvent of at least one member selected from the group consisting of said tetrahydrofuran derivatives and said 1,3-dioxolan derivatives.

15. The non-aqueous liquid electrolyte lithium secondary battery in accordance with claim 13, wherein the solvent in said electrolyte is a mixed solvent of at least one member selected from the group consisting of said tetrahydrofuran derivatives and said 1,3-dioxolan derivatives, with at least one member selected from tile group consisting of propylene carbonate, ethylene carbonate and diethyl carbonate.

16. The non-aqueous liquid electrolyte lithium secondary battery in accordance with claim 13, wherein at least one of $R_1$ and $R_2$ in said formulae (1) and (2) is an alkyl group containing from 2 to 6 carbon atoms.

* * * * *